July 25, 1972 R. C. PRUSINSKI ET AL 3,679,529
PANEL CONSTRUCTION
Original Filed Jan. 24, 1966
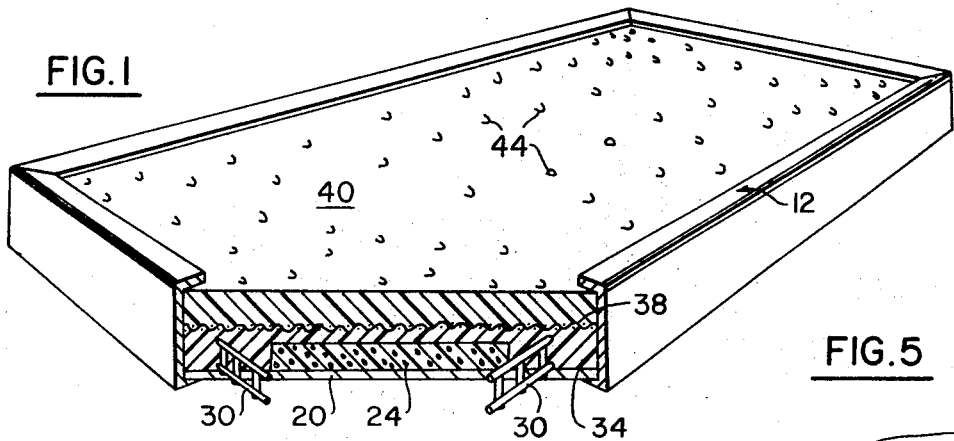
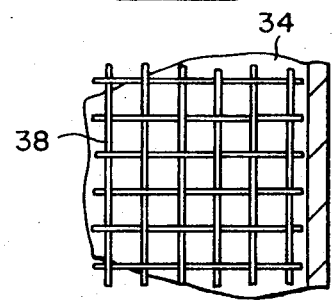
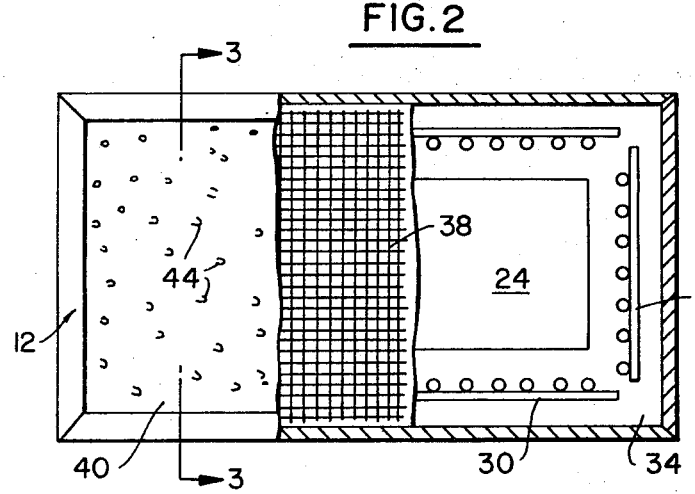
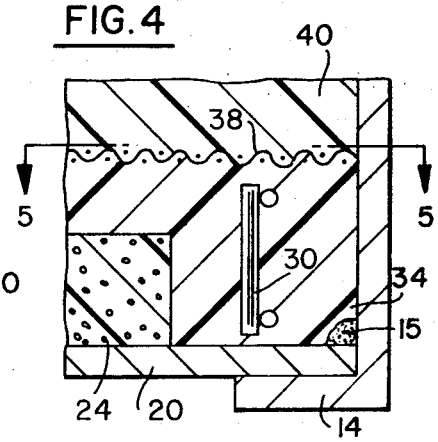
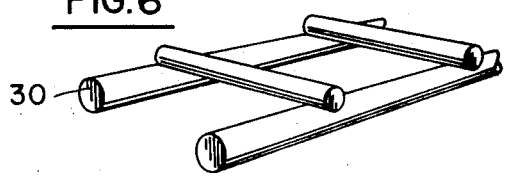
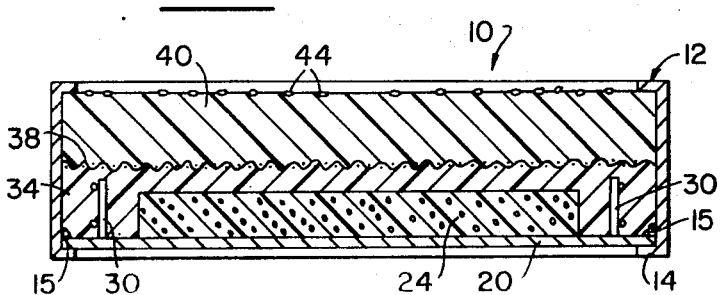
INVENTORS
RICHARD C. PRUSINSKI
MARCELLO FERMANI
ATTILIO TORCOLACCI
LUIGI FERMANI
BY Whittemore, Hulbert & Belknap
ATTORNEYS

United States Patent Office 3,679,529
Patented July 25, 1972

3,679,529
PANEL CONSTRUCTION
Richard C. Prusinski, Dearborn, and Marcello Fermani, Attilio Torcolacci, and Luigi Fermani, Detroit, Mich., assignors to Architectural Research Corporation, Detroit, Mich.
Original application Jan. 24, 1966, Ser. No. 522,527. Divided and this application Aug. 12, 1969, Ser. No. 871,209
Int. Cl. B24d *3/02;* B32b *1/04*
U.S. Cl. 161—44                4 Claims

ABSTRACT OF THE DISCLOSURE

A massive ornamental panel made up of a frame, rigid foamed material, a filled resinous material and a foraminous sheet.

---

This application is a division of our copending application, Ser. No. 522,527, filed Jan. 24, 1966, now abandoned.

This invention relates to a panel construction and the method of making same, and more particularly to a massive ornamental panel useful in the construction of the walls of a building.

Panel constructions have been previously proposed wherein blocks of rigid foamed material were encased between matrix layers of resinous material to provide solid ribs of resinous material between the blocks for compressive strength and at the same time to provide foamed material within the resinous matrix to thermally insulate and lighten the panel. In this instance the first step in the formation of the panel was to lay a filled liquid resin into a frame to partially fill the frame and form a first resinous layer. Blocks of rigid foamed material were then impressed into the layer in spaced apart relation while the resin was still in the plastic state. Then a second layer was laid over the first layer to cover the blocks and the panel was completed by imbedding small irregularly shaped stones or ceramic pieces in the exterior surface of the second layer while it was still in a plastic state. Such a two-layer system has the inherent disadvantage of being dimensionally unstable with respect to contraction and expansion occurring as a direct result of temperature variations and also of cracking and crazing resulting from fatigue, the fatigue being caused by repetitive contraction and expansion. The present invention overcomes these problems by providing in a two-layer system an ornamental panel which combines desired characteristics of dimensional stability, thermal insulation, high-strength, low weight, extreme durability and weatherability, and high stain resistance.

It is therefore an object to provide a multiple layer panel wherein the resinous layers are filled to an extent where there is negligible shrinking thereof as they cure.

Another object of our invention is to provide an improved panel construction having a frame with a back-up plate associated therewith, a body of rigid foamed material positioned in direct contact therewith, resinous material intermixed with filler particles to the extent of 60 to 90 percent by volume to encase the exposed surfaces of said foamed material and having a smooth outer surface, a foraminous sheet spread onto said surface, and an additional layer of said filled resinous material provided on said outer surface with the foraminous shet at the interface of the two layers.

Another object of our invention is to provide a new method of making a panel construction which comprises utilizing a back-up plate with a mass of rigid foamed material in direct contact therewith, encasing the exposed surfaces of said foamed maetrial with resinous material intermixed with filler particles providing a dough-like mass, working said mass into a layer of uniform thickness, laying a foraminous sheet onto the outer surface, applying additional resinous material onto said surface and sheet and working a smooth exposed surface in said latter resinous material.

Other objects of this invention will appear in the following description and appended claims, reference being had to the accompanying drawings forming a part of this specification wherein like reference characters designate corresponding parts in the several views.

In the drawings:

FIG. 1 is a perspective view in elevation and partly broken away of a panel construction embodying features of our invention;

FIG. 2 is a top plan view of our invention and partly broken away showing the reinforcing structude embodying features of our invention;

FIG. 3 is a view taken along the line 3—3 of FIG. 2 looking in the direction of the arrows;

FIG. 4 is an enlarged view in cross section of the upper righthand corner of FIG. 3 as viewed in the drawing;

FIG. 5 is a view taken along the line 5—5 of FIG. 4 looking in the direction of the arrows; and FIG. 6 is a perspective view of a portion of the reinforcing structure embodying features of our invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates a permanent frame which may be fabricated of aluminum or steel. The frame is a rectangular form with side and end walls having continuous inturned flanges 12 and 14 at the upper and lower ends thereof respectively. A back-up panel 20 is placed in the frame 10 on the flanges 14. The juncture of the panel and frame is caulked at 15. The panel 20 is constructed of a material such as steel, aluminum, plastic, asbestos, plaster or fibrous material, before the flange 14 is formed. If desired, the back-up panel and frame may be integrated into a pan shaped structure.

After the panel 20 is in place on flange 14 a block of rigid foamed material 24 is placed in direct contact with the back-up plate but it does not cover the entire area, only a major portion thereof. The block is a one piece article except in large installations, where many such blocks may be placed side by side.

Various types of foamed or honeycomb materials may be used to fabricate the block 24. However, foamed polyurethane or foamed glass are preferred materials. Foamed polyurethane is preferred for some applications in which high heat-insulation properties are desired. Foamed glass, which is a relatively strong material, is preferred when high panel strength is desired. Foamed material in comparison to resin materials forming the matrix is relatively inexpensive. Foamed material is lighter than an equal volume of resin.

After the block 24 is positioned on the back-up plate 20, the next step in the formation of the panel is to prepare resinous material preferably having intermixed therein between 60 and 90 percent filler material by volume to form a dough-like mass and place a portion thereof into the frame 10 to partially fill the frame. A reinforcing steel structure 30 of ladder-like construction is then placed on all sides of the block 24 as shown in FIGS. 2, 3 and 4. Such reinforcing structure is normally used only in large panels. After this additional like resinous material is added to cover the block 24 and reinforcing structure and the outer surface of the resin is smoothed to form a first layer 34.

A suitable resin for use in the invention may be a polyester resin. Polyester resins consist of the reaction product of a dibasic acid and dihydric alcohol dissolved in a polymerizable monomer. The disbasic acids used in the resin solution may be phthalic anhydride, isophthalic acids, adipic acid, tetra phthalic anhydride, maleic acid, fumaric acid, or itaconic acid. The dihydric alcohols in the polyester resin solution may, for example, be any glycol such as ethylene glycol, propylene glycol, diethylene glycol, dipropylene glycol, or 1,3-butylene glycol. The polymerizable monomer used in the polyester resin solution can, for example, be styrene, vinyl toluene, methyl methacrylate, or diallyl phthlate.

Various filler materials can be intermixed in the resin, as for example, small mineral particles, asbestos fibers, perlite ground chalk, finely ground wood chips, and fiberglass wool. The filler may be combined with suitable pigments to provide a desired color in the finished panel.

The preferred filler material is small mineral particles. The particles may be, for example, sand, marble, granite or the like. Silica sand is preferred. The mineral particles serve two functions in addition to acting as an inexpensive fill. Firstly, they perform the usual function of reinforcing the resin to increase the overall strength of the panel. Secondly, and more importantly, the particles give the exterior surface of the panel a texture similar to that of concrete. The usual glossy appearance of a resin is considered objectionable in many applications, the texture of concrete being preferred. The desired texture is achieved as the result of the particles which are at or near the outer surface of the panel.

By the intermixing of 60 to 90 percent filler material by volume, preferably 80 percent, with the resinous material a dough-like mass is provided which may be smoothed by hand with the use of a trowel similar to the manner of applying plaster or cement. Additionally, vibration techniques may be employed for applying the resin. With the percentage of filler used there is an equalization of stresses when the plastic cures and shrinks and the surface remains smooth and the layer formed thereby retains its strength.

After the layer 34 is formed, and before it cures, a sheet 38 of wire screen, woven fiberglass or other foraminous material is laid on the upper surface of layer 34 to completely overlie the plastic mass. The sheet 38 is smoothed out so that there are no wrinkles or bubbles. Such wrinkles or bubbles would tend to cause de-lamination of the panel. Another layer 40 of the same dough-like plastic mass is placed on the sheet 38. Portions of the two layers penetrate the sheet 38 and combine to cause adherence of the two layers. The upper surface of layer 40 is also smoothed.

Small, irregularly shaped stones or ceramic pieces 44 may then be imbedded in the exterior surface of the layer 40. The pieces 44 may be such as glass, quartz, marble or granite.

FIG. 4 is an enlarged fragmentary view showing portions of layers 34 and 40 with fiberglass 38 pressed therebetween.

FIG. 5 is an enlarged fragmentary view of fiberglass 38 with portions of layer 40 between the square openings in said fiberglass.

It will be noted that in this construction, stresses due to temperature changes are compensated for by the relationship of the panel 20, frame 10, foraminous sheet 38 and layers 34 and 40. The inner face of layer 34 directly abuts against the panel 20 but does not adhere thereto. Consequently, the layer 34 is able to expand and contract independently of the panel. However, the panel and frame tend to stabilize the unit against bowing and other warpage. The provision of layer 40 and the foraminous sheet between the interface of this layer and layer 34 result in stress balancing of the large surface of the outermost portions of layer 34.

Having thus described our invention, we claim:

1. A massive ornamental panel of a plurality of adhering layers comprising a frame including a back-up plate, a body of rigid foamed material having one surface positioned in direct contact with said back-up plate, said foamed material being encased by a first layer of resinous material intermixed with a substantial amount of filler, said layer covering the exposed surfaces, excepting said one surface, of said foamed material and contacting the back-up plate around the periphery of the foamed material, the outer surface of said first layer of resinous material being smooth, a second layer of filled resinous material adhered to the first layer and having a smooth surface adjacent the smooth surface of the first layer, and a foraminous sheet at the interface of said first and second layers substantially completely overlying said interface, said sheet being free from wrinkles or bubbles.

2. A panel as defined in claim 1, and further characterized in that said filler comprises mineral particles to the extent of 60% to 90% of the resinous material.

3. A panel as defined in claim 1, and further characterized in the provision of spaced apart reinforcing members in said first layer around the perimeter of said foamed material.

4. A panel as defined in claim 1, and further characterized in that said frame is generally rectangular and has a peripheral flange, said back-up plate being supported by the flange interiorly of the frame.

References Cited

UNITED STATES PATENTS

| 1,596,482 | 8/1926 | Ewen | 264—256 |
| 3,131,514 | 5/1964 | Siek | 264—277 |
| 3,298,894 | 1/1967 | Barnette | 161—160 |
| 3,324,213 | 6/1967 | Anfinset | 264—255 |

DOUGLAS J. DRUMMOND, Primary Examiner

U.S. Cl. X.R.

52—309; 161—72, 161